US012586049B2

(12) United States Patent
White et al.

(10) Patent No.: US 12,586,049 B2
(45) Date of Patent: Mar. 24, 2026

(54) SYSTEM AND METHOD FOR PROVIDING A REAL-TIME PAYMENT BETWEEN A CUSTOMER FINANCIAL INSTITUTION ACCOUNT AND A MERCHANT FINANCIAL INSTITUTION ACCOUNT FOR A TRANSACTION BASED ON A DIRECT COMMUNICATION BETWEEN A USER DEVICE AND A POINT-OF-SALE DEVICE

(71) Applicant: Worldpay, LLC, Symmes Township, OH (US)

(72) Inventors: Janai A. White, Denver, CO (US); Denzelle R. Walker, Bridgeport, TX (US); Blake C. Yarbrough, Aurora, CO (US); Katherine E. Crawford, Arvada, CO (US); Caleb H. Kirshner, Denver, CO (US); Elise A. Carrasco, Austin, TX (US); Vincent D. Gardiner, Denver, CO (US)

(73) Assignee: Worldpay, LLC, Symmes Township, OH (US)

( * ) Notice: Subject to any disclaimer, the term of this patent is extended or adjusted under 35 U.S.C. 154(b) by 48 days.

(21) Appl. No.: 17/566,111

(22) Filed: Dec. 30, 2021

(65) Prior Publication Data

US 2023/0214809 A1 Jul. 6, 2023

(51) Int. Cl.
G06Q 20/20 (2012.01)
G06K 7/14 (2006.01)
(52) U.S. Cl.
CPC ......... G06Q 20/206 (2013.01); G06K 7/1417 (2013.01); G06Q 20/204 (2013.01)
(58) Field of Classification Search
CPC ... G06Q 20/206; G06Q 20/204; G06K 7/1417
See application file for complete search history.

(56) References Cited

U.S. PATENT DOCUMENTS 10,467,615 B1 * 11/2019 Omojola ............ G06Q 30/0637
2015/0088674 A1 * 3/2015 Flurscheim .......... G06Q 20/326
705/17

(Continued)

FOREIGN PATENT DOCUMENTS

WO 2014119963 A1 8/2014

OTHER PUBLICATIONS

International Search Report issued in International Application No. PCT/US2022/082543 dated Apr. 21, 2023 (34 pages).

(Continued)

*Primary Examiner* — A. Hunter Wilder
*Assistant Examiner* — Joseph M Mutschler
(74) *Attorney, Agent, or Firm* — Bookoff McAndrews, PLLC

(57) ABSTRACT

Systems and methods are disclosed for providing a payment authorization to a real-time payment (RTP) network to initiate an RTP between a customer financial institution account and a merchant financial institution account. One method performed by a payment facilitator device includes, based on a user device of a customer and a point-of-sale (POS) device of a merchant performing a direct communication regarding a transaction, receiving a payment request for a transaction amount of the transaction and receiving a customer authorization for the transaction. The payment facilitator then provides a payment authorization to an RTP network to initiate an RTP for the transaction amount of the transaction from a customer financial institution account to a merchant financial institution account, based on receiving the customer authorization for the transaction.

12 Claims, 13 Drawing Sheets

(56) References Cited

U.S. PATENT DOCUMENTS

| | | | |
|---|---|---|---|
| 2018/0039972 A1* | 2/2018 | Meaney | G06Q 20/40 |
| 2019/0095886 A1 | 3/2019 | Tran et al. | |
| 2019/0139042 A1 | 5/2019 | McCormick | |
| 2020/0118090 A1* | 4/2020 | Bartrim | G06Q 20/204 |
| 2021/0081946 A1 | 3/2021 | Opondo et al. | |
| 2021/0256524 A1* | 8/2021 | Willis | G06Q 20/4016 |
| 2021/0402392 A1 | 12/2021 | Shachar et al. | |
| 2022/0270168 A1* | 8/2022 | Daya | G06Q 40/03 |

OTHER PUBLICATIONS https://www.youtube.com/watch?v=E5hb90FA9ok time stamp 0:11 and 0:50 (Jan. 28, 2020) ("Paypal") (Year: 2020).

* cited by examiner

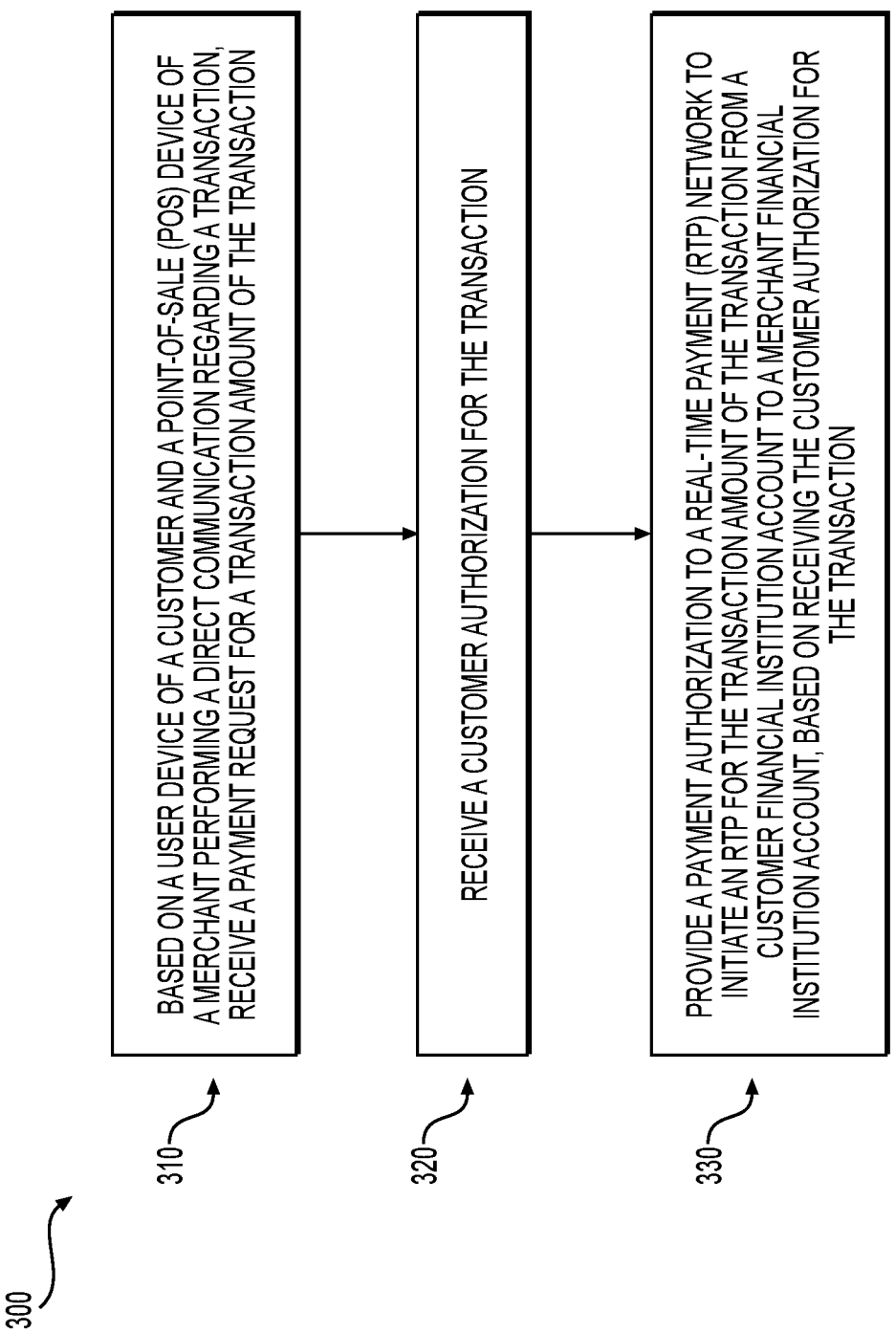

BASED ON A USER DEVICE OF A CUSTOMER AND A POINT-OF-SALE (POS) DEVICE OF A MERCHANT PERFORMING A DIRECT COMMUNICATION REGARDING A TRANSACTION, RECEIVE A PAYMENT REQUEST FOR A TRANSACTION AMOUNT OF THE TRANSACTION

310

RECEIVE A CUSTOMER AUTHORIZATION FOR THE TRANSACTION

320

PROVIDE A PAYMENT AUTHORIZATION TO A REAL-TIME PAYMENT (RTP) NETWORK TO INITIATE AN RTP FOR THE TRANSACTION AMOUNT OF THE TRANSACTION FROM A CUSTOMER FINANCIAL INSTITUTION ACCOUNT TO A MERCHANT FINANCIAL INSTITUTION ACCOUNT, BASED ON RECEIVING THE CUSTOMER AUTHORIZATION FOR THE TRANSACTION

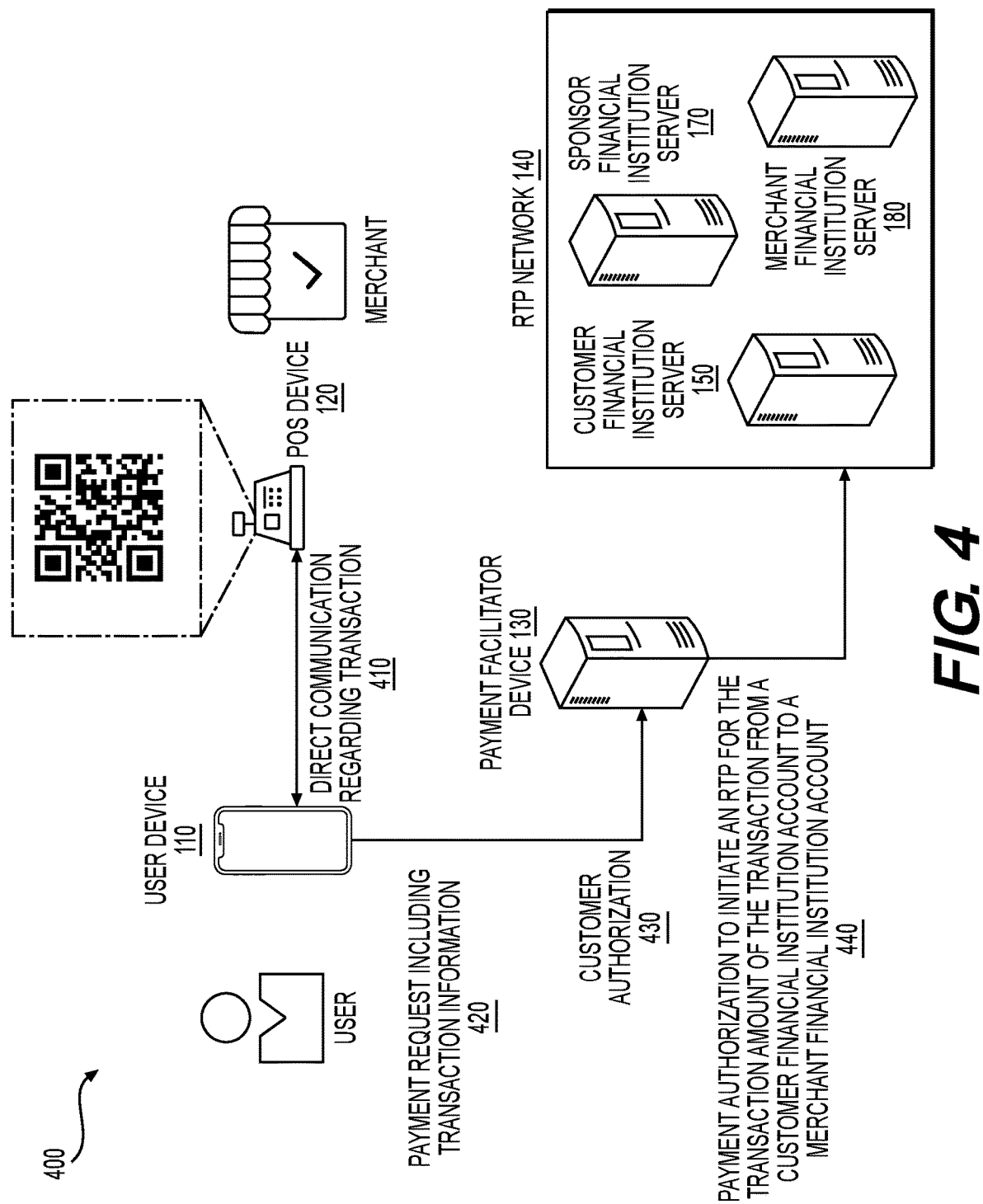

400

USER DEVICE 110

USER

MERCHANT

POS DEVICE 120

DIRECT COMMUNICATION REGARDING TRANSACTION 410

PAYMENT FACILITATOR DEVICE 130

PAYMENT REQUEST INCLUDING TRANSACTION INFORMATION 420

CUSTOMER AUTHORIZATION 430

PAYMENT AUTHORIZATION TO INITIATE AN RTP FOR THE TRANSACTION AMOUNT OF THE TRANSACTION FROM A CUSTOMER FINANCIAL INSTITUTION ACCOUNT TO A MERCHANT FINANCIAL INSTITUTION ACCOUNT 440

RTP NETWORK 140

SPONSOR FINANCIAL INSTITUTION SERVER 170

MERCHANT FINANCIAL INSTITUTION SERVER 180

CUSTOMER FINANCIAL INSTITUTION SERVER 150

*FIG. 4*

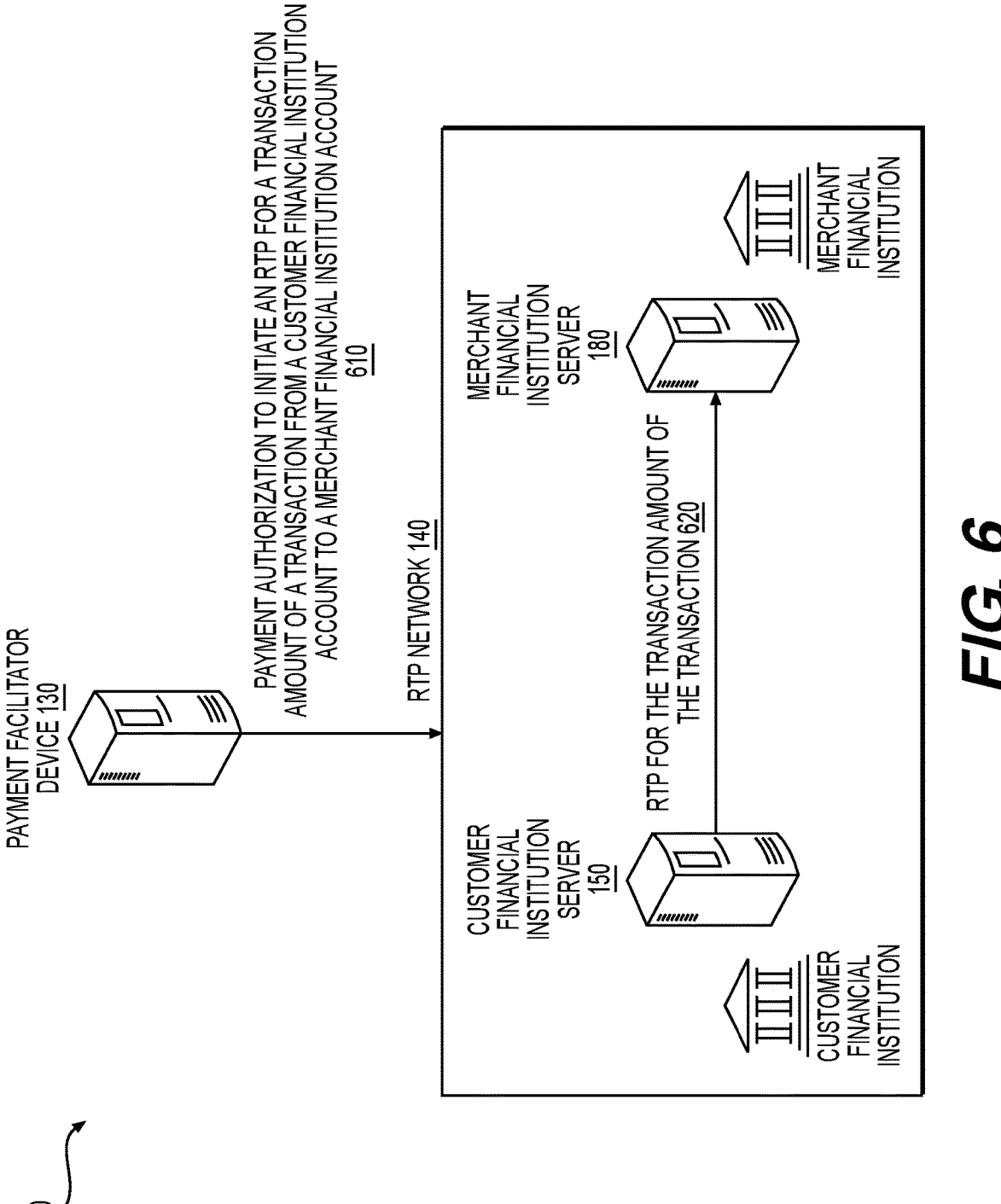

PAYMENT FACILITATOR DEVICE 130

PAYMENT AUTHORIZATION TO INITIATE AN RTP FOR A TRANSACTION AMOUNT OF A TRANSACTION FROM A CUSTOMER FINANCIAL INSTITUTION ACCOUNT TO A MERCHANT FINANCIAL INSTITUTION ACCOUNT 610

RTP NETWORK 140

MERCHANT FINANCIAL INSTITUTION SERVER 180

CUSTOMER FINANCIAL INSTITUTION SERVER 150

RTP FOR THE TRANSACTION AMOUNT OF THE TRANSACTION 620

CUSTOMER FINANCIAL INSTITUTION

MERCHANT FINANCIAL INSTITUTION

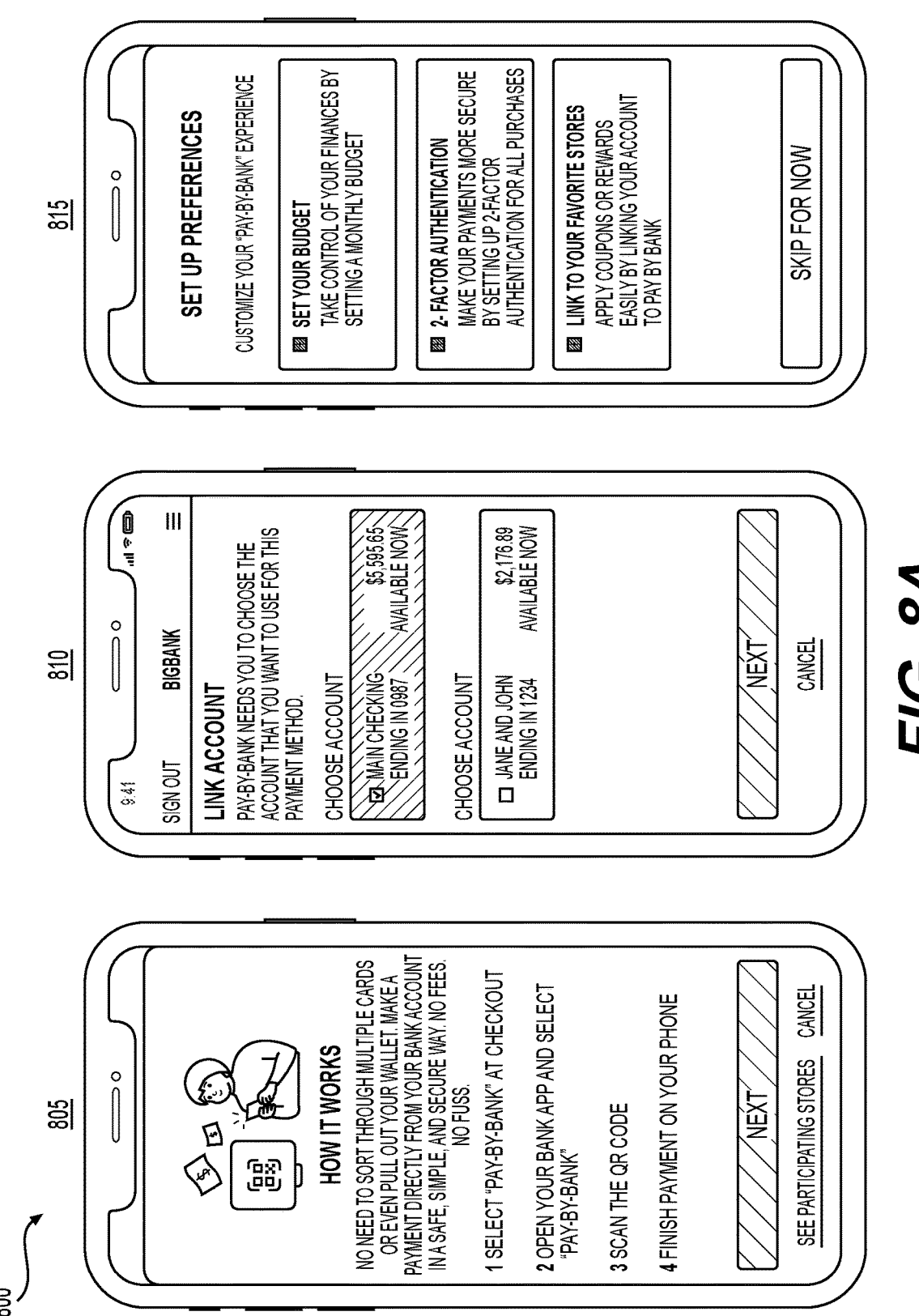

815

SET UP PREFERENCES

CUSTOMIZE YOUR "PAY-BY-BANK" EXPERIENCE

SET YOUR BUDGET
TAKE CONTROL OF YOUR FINANCES BY SETTING A MONTHLY BUDGET

2- FACTOR AUTHENTICATION
MAKE YOUR PAYMENTS MORE SECURE BY SETTING UP 2-FACTOR AUTHENTICATION FOR ALL PURCHASES

LINK TO YOUR FAVORITE STORES
APPLY COUPONS OR REWARDS EASILY BY LINKING YOUR ACCOUNT TO PAY BY BANK

SKIP FOR NOW

810

9:41     SIGN OUT     BIGBANK

LINK ACCOUNT
PAY-BY-BANK NEEDS YOU TO CHOOSE THE ACCOUNT THAT YOU WANT TO USE FOR THIS PAYMENT METHOD.

CHOOSE ACCOUNT

MAIN CHECKING    $5,595.65
ENDING IN 0987    AVAILABLE NOW

CHOOSE ACCOUNT

JANE AND JOHN    $2,176.89
ENDING IN 1234    AVAILABLE NOW

NEXT

CANCEL

805

HOW IT WORKS

NO NEED TO SORT THROUGH MULTIPLE CARDS OR EVEN PULL OUT YOUR WALLET. MAKE A PAYMENT DIRECTLY FROM YOUR BANK ACCOUNT IN A SAFE, SIMPLE, AND SECURE WAY. NO FEES. NO FUSS.

1 SELECT "PAY-BY-BANK" AT CHECKOUT

2 OPEN YOUR BANK APP AND SELECT "PAY-BY-BANK"

3 SCAN THE QR CODE

4 FINISH PAYMENT ON YOUR PHONE

NEXT

SEE PARTICIPATING STORES    CANCEL

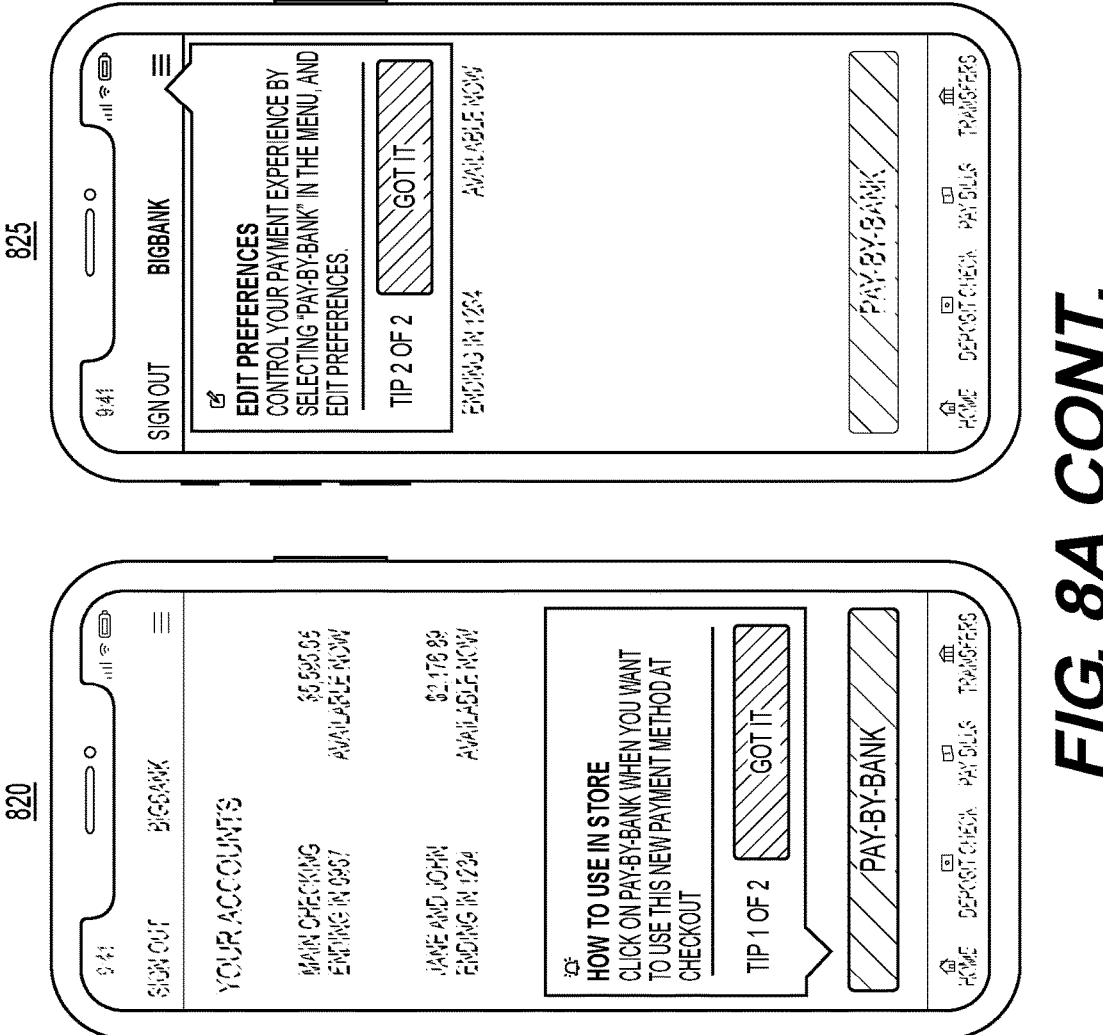
*FIG. 8A CONT.*

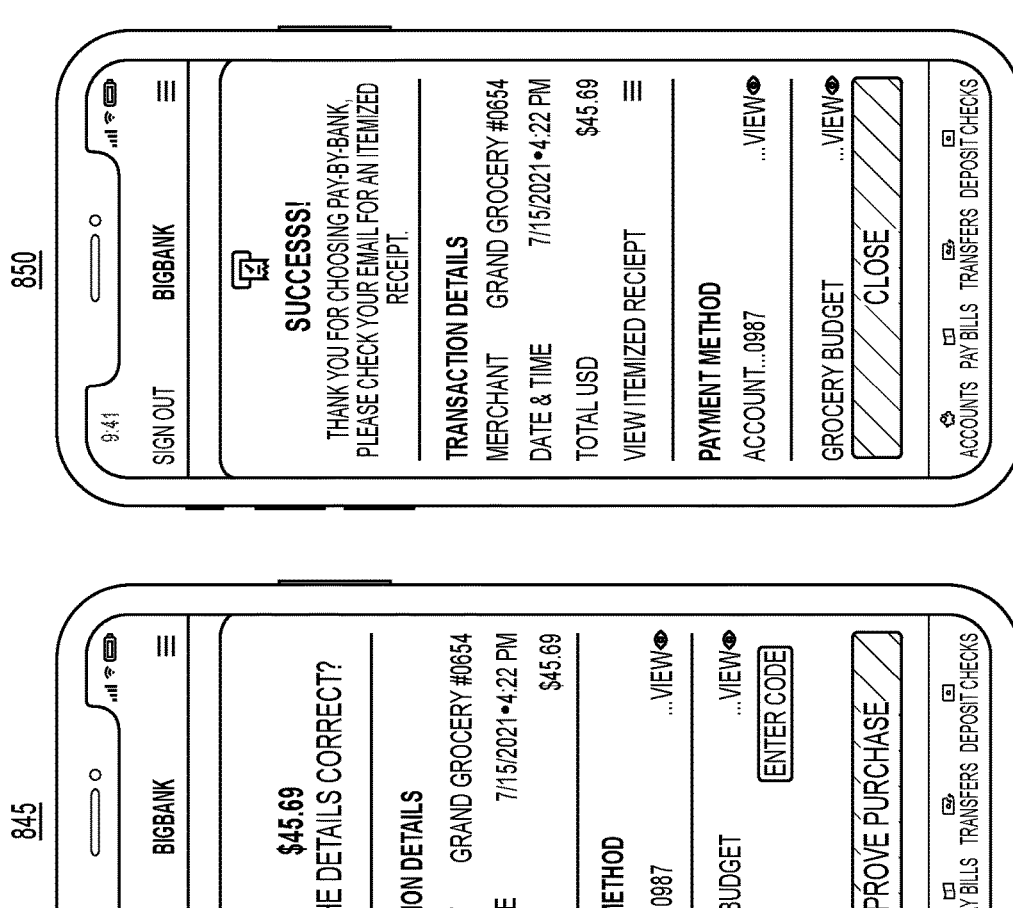
*FIG. 8B CONT.*

SYSTEM AND METHOD FOR PROVIDING A REAL-TIME PAYMENT BETWEEN A CUSTOMER FINANCIAL INSTITUTION ACCOUNT AND A MERCHANT FINANCIAL INSTITUTION ACCOUNT FOR A TRANSACTION BASED ON A DIRECT COMMUNICATION BETWEEN A USER DEVICE AND A POINT-OF-SALE DEVICE

TECHNICAL FIELD

The present disclosure relates to facilitating electronic transactions between users and merchants via a real-time payment (RTP) network. More particularly, the present disclosure relates to a payment facilitator device configured to provide a payment authorization to an RTP network to initiate an RTP between a customer financial institution account and a merchant financial institution account for a transaction, based on a user device of a customer and a point-of-sale (POS) device of a merchant performing a direct communication regarding the transaction.

BACKGROUND

A customer may desire to purchase an item from a merchant. To do so, the customer typically utilizes a payment vehicle (e.g., a debit card, a credit card, etc.) to initiate a transaction via a POS device of the merchant. A payment network (e.g., a debit card network, a credit card network, etc.) then authorizes and processes the transaction. Ultimately, the transaction amount of the transaction is provided to a financial institution account of the merchant. Utilization of the payment network introduces a network delay between the time of the transaction and the time of the transaction amount being provided to the financial institution account of the merchant, poses a security risk for sensitive information, and introduces fees that are incurred by the customer and/or the merchant.

SUMMARY

According to an aspect of an example embodiment, a payment facilitator device may include a memory configured to store instructions; and a processor configured to execute the instructions to: based on a user device of a customer and a point-of-sale (POS) device of a merchant performing a direct communication regarding a transaction, receive a payment request for a transaction amount of the transaction; receive a customer authorization for the transaction; and provide a payment authorization to a real-time payment (RTP) network to initiate an RTP for the transaction amount of the transaction from a customer financial institution account to a merchant financial institution account, based on receiving the customer authorization for the transaction.

According to an aspect of an example embodiment, a method performed by a payment facilitator device may include, based on a user device of a customer and a point-of-sale (POS) device of a merchant performing a direct communication regarding a transaction, receiving a payment request for a transaction amount of the transaction; receiving a customer authorization for the transaction; and providing a payment authorization to a real-time payment (RTP) network to initiate an RTP for the transaction amount of the transaction from a customer financial institution account to a merchant financial institution account, based on receiving the customer authorization for the transaction.

According to an aspect of an example embodiment, a non-transitory computer-readable medium may store instructions that, when executed by a processor of a payment facilitator device, cause the processor to: based on a user device of a customer and a point-of-sale (POS) device of a merchant performing a direct communication regarding a transaction, receive a payment request for a transaction amount of the transaction; receive a customer authorization for the transaction; and provide a payment authorization to a real-time payment (RTP) network to initiate an RTP for the transaction amount of the transaction from a customer financial institution account to a merchant financial institution account, based on receiving the customer authorization for the transaction.

BRIEF DESCRIPTION OF THE DRAWINGS

The accompanying drawings, which are incorporated in and constitute a part of this specification, illustrate example embodiments of the present disclosure and together with the description, serve to explain the principles of the disclosure.

FIG. 3 is a flowchart of an example process 300 for providing an RTP from a customer financial institution account to a merchant financial institution account based on a direct communication between a user device of a customer and a POS device of a merchant;

FIG. 4 is an example diagram of a process 400 of providing an RTP from a customer financial institution account to a merchant financial institution account based on a direct communication between a user device of a customer and a POS device of a merchant and based on a payment request from the user device;

FIG. 6 is a diagram of an example process 600 of providing a payment authorization to an RTP network to initiate an RTP for a transaction amount of a transaction directly from a customer financial institution account to a merchant financial institution account;

FIGS. 8A and 8B are diagrams of a user interface 800 of an application of a user device that is associated with a customer financial institution.

DETAILED DESCRIPTION

The present disclosure relates to facilitating electronic transactions between users and merchants via a real-time payment (RTP) network. More particularly, the present disclosure relates to a payment facilitator device configured to provide a payment authorization to an RTP network to initiate an RTP between a customer financial institution account and a merchant financial institution account for a transaction, based on a user device of a customer and a point-of-sale (POS) device of a merchant performing a direct communication regarding the transaction.

As discussed above, utilization of a debit card network or a credit card network introduces a network delay between the time of the transaction and the time of the transaction amount being provided to the financial institution account of the merchant, poses a security risk for sensitive information, poses a risk for insufficient funds on debit transactions, and introduces fees that are incurred by the customer and/or the merchant.

The embodiments described in the current disclosure solve or mitigate the aforementioned problems by implementing a payment facilitator device in the payment transaction workflow, the payment facilitator device is configured to provide a payment authorization to an RTP network that enables an RTP between a customer financial institution account and merchant financial institution account for a transaction, based on a user device of a customer and a POS device of a merchant performing a direct communication regarding the transaction.

For example, in one embodiment, the payment facilitator device may receive a payment request for a transaction amount of a transaction based on a user device of a customer and a POS device of a merchant performing a direct communication regarding a transaction. Further, the payment facilitator device may receive a customer authorization for the transaction, and provide a payment authorization to an RTP network to initiate an RTP for the transaction amount of the transaction from a customer financial institution account to a merchant financial institution account, based on receiving the customer authorization for the transaction.

By implementing the payment facilitator device as described in the current disclosure, the present disclosure reduces a network delay between the time of the transaction and the time of the transaction amount being provided to the financial institution account of the merchant, improves security sensitive information, and reduces fees that are incurred by the customer and/or the merchant.

Figure 1:
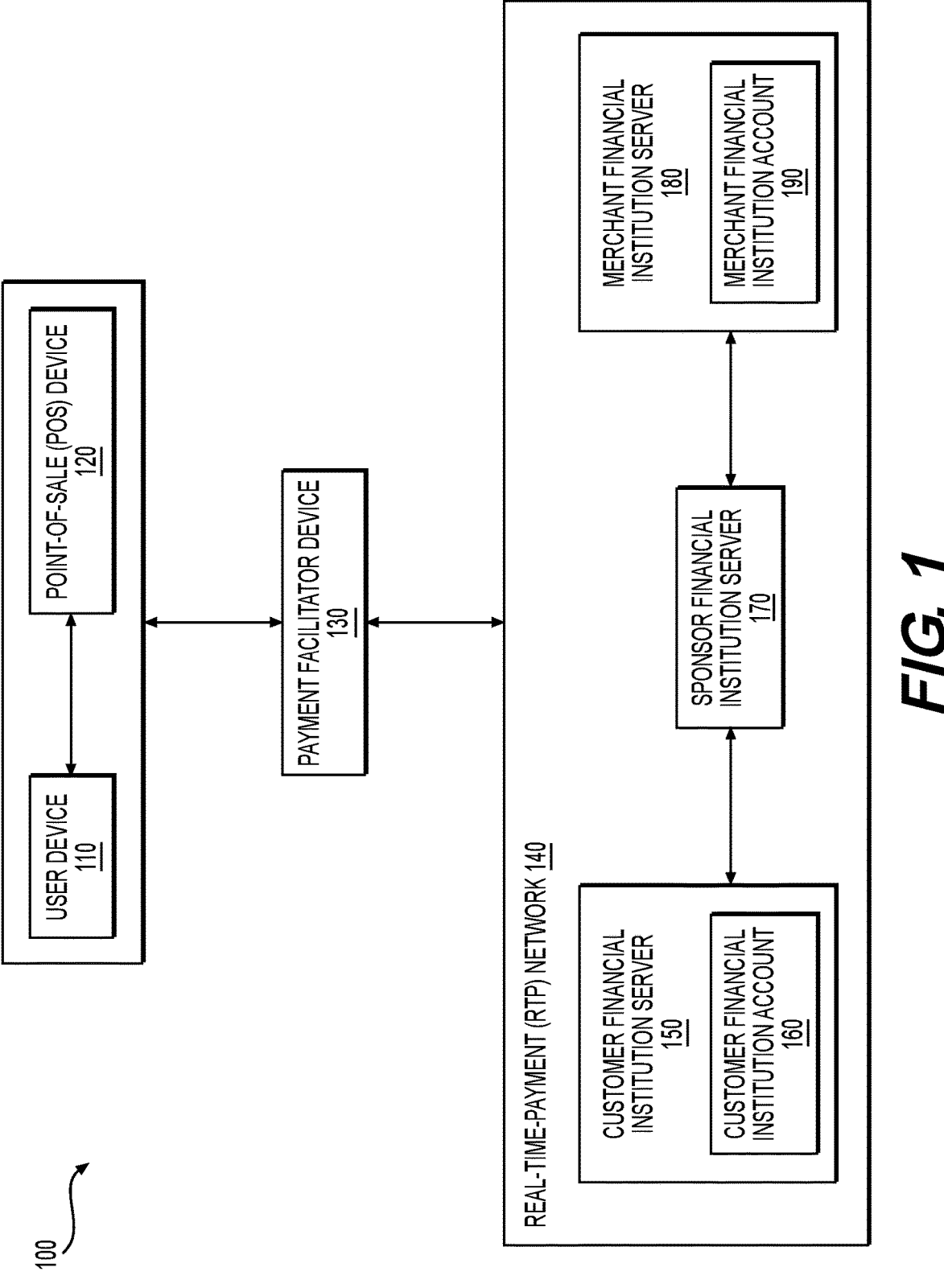
FIG. 1 is a diagram of an example system 100 for providing an RTP from a customer financial institution account to a merchant financial institution account based on a direct communication between a user device of a customer and a POS device of a merchant.

FIG. 1 is a diagram of an example system 100 for providing an RTP from a customer financial institution account to a merchant financial institution account based on a direct communication between a user device of a customer and a POS device of a merchant.

As shown in FIG. 1, the system 100 may include a user device 110 (e.g., a smartphone, a tablet computer, a smart watch, etc.), a POS device 120 (e.g., a physical POS device, a virtual POS device, etc.), a payment facilitator device 130 (e.g., a server, a cloud computing platform, a computing device, a user device, a POS device, etc.), an RTP network 140 (e.g., a network of computing devices, a network of clouding computing platforms, etc.), a customer financial institution server 150 (e.g., a server, a cloud computing platform, etc.), a customer financial institution account 160 (e.g., a server, a cloud computing platform, etc.), a sponsor financial institution server 170 (e.g., a server, a cloud computing platform, etc.), a merchant financial institution server 180 (e.g., a server, a cloud computing platform, etc.), and a merchant financial institution account 190 (e.g., a server, a cloud computing platform, etc.).

One or more of the devices of the system 100 may be integrated into a single device. Additionally, the customer financial institution account 160 and the merchant financial institution account 190 may be associated with a same underlying financial institution, and/or may be associated with a same underlying financial institution server.

The payment facilitator device 130 may be implemented as a physical device. For example, the payment facilitator device 130 may be implemented as a server that is remote from a POS, may be implemented as a POS terminal, or the like. Alternatively, the payment facilitator device 130 may be implemented in software. For example, the payment facilitator device 130 may be implemented as software executable by the user device 110, may be implemented as software executable by the POS device 120, or the like.

The system 100 may be configured to provide an RTP from a customer financial institution account 160 to a merchant financial institution account 190, based on a direct communication between the user device 110 and the POS device 120.

As a non-limiting example, a customer may desire to purchase a set of items from a merchant. To do so, the customer may select the set of items to be purchased from a merchant. The set of items may be input to the POS device 120. At this point, a transaction amount may refer to a total amount of the set of items. Further, a transaction may refer to the purchase of the set of items by the customer from the merchant.

To initiate the RTP, the user device 110 and the POS device 120 may perform a direct communication regarding the transaction in order to communicate transaction information. As an example, the user device 110 may display a quick response (QR) code that is representative of (i.e., encodes) transaction information, such as a customer identifier, a customer financial institution account identifier, and a customer authentication. In this case, the POS device 120 may read the QR code, and obtain the transaction information. Further, the POS device 120 may provide, to the payment facilitator device 130, a payment request for the transaction amount of the transaction. The payment request may include transaction information such as the customer identifier, the customer financial institution account identifier, the customer authentication, a merchant identifier, the transaction amount, and a payment request identifier. As discussed above, a portion of the transaction information included in the payment request, such as the customer identifier, the customer financial institution account identifier, and the customer authentication, may correspond to the transaction information received from the user device 110 as a QR code.

As another example, the POS device 120 may display a QR code including transaction information, such as the merchant identifier, the transaction amount, and the payment request identifier. In this case, the user device 110 may read the QR code, and obtain the transaction information. Further, the user device 110 may provide, to the payment facilitator device 130, a payment request for the transaction amount of the transaction including transaction information such as a customer identifier, a customer financial institution account identifier, a customer authentication, the merchant identifier, the transaction amount, and the payment request identifier. Here, a portion of the transaction information included in the payment request, such as the merchant identifier, the transaction amount, and the payment request identifier, may correspond to the transaction information received from the POS device 120 as a QR code.

In either case, the payment facilitator device 130 may receive the payment request and the transaction information, and may receive a customer authorization for the transaction. For example, the payment facilitator device 130 may prompt the user device 110 for the customer authorization, and receive the customer authorization based on the prompt. As another example, the payment facilitator device 130 may receive the customer authorization from the user device 110 as a part of the payment request.

The payment facilitator device 130 may provide a payment authorization to an RTP network 140 to initiate an RTP for the transaction amount of the transaction from a customer financial institution account 160 to a merchant financial institution account 190, based on receiving the customer authorization for the transaction. Based on the payment authorization, an RTP may be provided from the customer financial account 160 to the merchant financial institution account 190.

In this way, example embodiments of the present disclosure improve the efficiency of transactions by providing an RTP from a customer financial institution account 160 to a merchant financial institution account 190, reduce network delay associated with transactions by avoiding utilization of debit card networks or credit card networks, enhance the security of transactions by exchanging transaction information via a direct communication between the user device 110 and the POS device 120, reduce fees associated with transactions by avoiding utilization of debit cards and credit cards, and improve the efficiency and ease of transactions by permitting the customer to purchase a set of items by interacting with an application of the user device 110.

Figure 2:
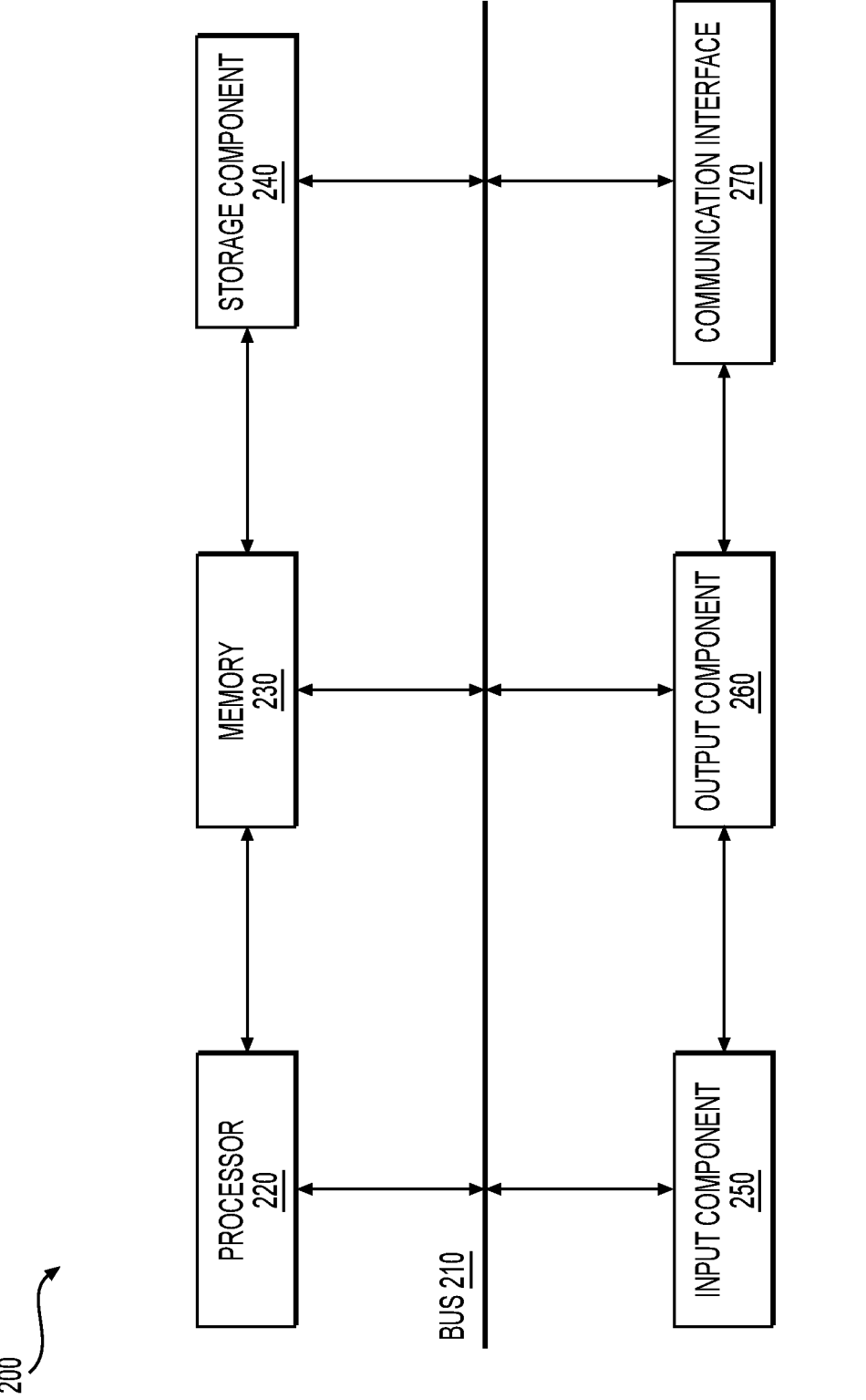
FIG. 2 is a diagram of example components of a device 200.

FIG. 2 is a diagram of example components of a device 200. Device 200 may correspond to the user device 110, the POS device 120, the payment facilitator device 130, the RTP network 140, the customer financial institution server 150, the sponsor financial institution server 170, and/or the merchant financial institution server 180.

As shown in FIG. 2, the device 200 may include a bus 210, a processor 220, a memory 230, a storage component 240, an input component 250, an output component 260, and a communication interface 270.

The bus 210 includes a component that permits communication among the components of the device 200. The processor 220 may be implemented in hardware, firmware, or a combination of hardware and software. The processor 220 may be a central processing unit (CPU), a graphics processing unit (GPU), an accelerated processing unit (APU), a microprocessor, a microcontroller, a digital signal processor (DSP), a field-programmable gate array (FPGA), an application-specific integrated circuit (ASIC), or another type of processing component.

The processor 220 may include one or more processors capable of being programmed to perform a function. The memory 230 may include a random access memory (RAM), a read only memory (ROM), and/or another type of dynamic or static storage device (e.g., a flash memory, a magnetic memory, and/or an optical memory) that stores information and/or instructions for use by the processor 220.

The storage component 240 may store information and/or software related to the operation and use of the device 200. For example, the storage component 240 may include a hard disk (e.g., a magnetic disk, an optical disk, a magneto-optic disk, and/or a solid state disk), a compact disc (CD), a digital versatile disc (DVD), a floppy disk, a cartridge, a magnetic tape, and/or another type of non-transitory computer-readable medium, along with a corresponding drive.

The input component 250 may include a component that permits the device 200 to receive information, such as via user input (e.g., a touch screen display, a keyboard, a keypad, a mouse, a button, a switch, and/or a microphone).

Additionally, or alternatively, the input component 250 may include a sensor for sensing information (e.g., a global positioning system (GPS) component, an accelerometer, a gyroscope, and/or an actuator). The output component 260 may include a component that provides output information from the device 200 (e.g., a display, a speaker, and/or one or more light-emitting diodes (LEDs)).

The communication interface 270 may include a transceiver-like component (e.g., a transceiver and/or a separate receiver and transmitter) that enables the device 200 to communicate with other devices, such as via a wired connection, a wireless connection, or a combination of wired and wireless connections. The communication interface 270 may permit the device 200 to receive information from another device and/or provide information to another device. For example, the communication interface 270 may include an Ethernet interface, an optical interface, a coaxial interface, an infrared interface, a radio frequency (RF) interface, a universal serial bus (USB) interface, a Wi-Fi interface, a cellular network interface, or the like.

The device 200 may perform one or more processes described herein. The device 200 may perform these processes based on the processor 220 executing software instructions stored by a non-transitory computer-readable medium, such as the memory 230 and/or the storage component 240. A computer-readable medium may be defined herein as a non-transitory memory device. A memory device may include memory space within a single physical storage device or memory space spread across multiple physical storage devices.

The software instructions may be read into the memory 230 and/or the storage component 240 from another computer-readable medium or from another device via the communication interface 270. When executed, the software instructions stored in the memory 230 and/or the storage component 240 may cause the processor 220 to perform one or more processes described herein. Additionally, or alternatively, hardwired circuitry may be used in place of or in combination with software instructions to perform one or more processes described herein. Thus, implementations described herein are not limited to any specific combination of hardware circuitry and software.

The device 200 may include a cloud server or a group of cloud servers. For example, the device 200 may be hosted in a cloud computing environment, or may be partially cloud-based. The cloud computing environment may refer to an environment that hosts the device 200. The cloud computing environment may provide computation, software, data access, storage, etc., services to one or more of the user device 110, the POS device 120, the payment facilitator device 130, the RTP network 140, the customer financial institution server 150, the customer financial institution account 160, the sponsor financial institution server 170, the merchant financial institution server 180, and/or the merchant financial institution account 190

The cloud computing environment may include a group of computing resources such as applications, virtual machines (VMs), virtualized storages (e.g., databases), hypervisors, or the like. The application may include one or more software applications that may be provided to or accessed by the user device 110, the POS device 120, the payment facilitator device 130, the RTP network 140, the customer financial institution server 150, the customer financial institution account 160, the sponsor financial institution server 170, the merchant financial institution server 180, and/or the merchant financial institution account 190. The VM may include a software implementation of a machine that executes programs like a physical machine. The virtualized storage may include one or more storage systems and/or one or more devices that use virtualization techniques within the storage systems or devices of the cloud computing environment. The hypervisor may provide hardware virtualization techniques that allow multiple operating systems to execute concurrently on a host computer.

The number and arrangement of the components shown in FIG. 2 are provided as an example. In practice, the device 200 may include additional components, fewer components, different components, or differently arranged components than those shown in FIG. 2. Additionally, or alternatively, a set of components (e.g., one or more components) of the device 200 may perform one or more functions described as being performed by another set of components of the device 200.

FIG. 3 is a flowchart of an example process 300 for providing an RTP from a customer financial institution account to a merchant financial institution account based on a direct communication between a user device of a customer and a POS device of a merchant.

As shown in FIG. 3, the process 300 may include, based on a user device of a customer and a POS device of a merchant performing a direct communication regarding a transaction, receiving a payment request for a transaction amount of the transaction including information identifying a customer financial institution account and a merchant financial institution account (operation 310).

For example, the payment facilitator device 130 may receive a payment request for a transaction amount of a transaction, based on the user device 110 and the POS device 120 performing a direct communication regarding the transaction.

The payment request may be a request for an RTP for a transaction amount of a transaction from the customer financial institution account 160 to the merchant financial institution account 190.

The payment request may include transaction information, such as information identifying the payment request (e.g., a payment request globally unique identifier (GUID)), information identifying the transaction (e.g., a transaction identifier), information identifying the transaction amount, information identifying the transaction time and date (e.g., a timestamp), information identifying the transaction location (e.g., geographical coordinates, a merchant address, or the like), information identifying the customer (e.g., a customer identifier), information identifying the customer financial institution account 160 (e.g., a customer financial institution account identifier), information identifying the user device 110 (e.g., a device identifier, an Internet Protocol (IP) address, a media access control (MAC) address, or the like), information identifying the merchant (e.g., a merchant identifier), information identifying the merchant financial institution account 190 (e.g., a merchant financial institution account identifier), and/or the like.

The direct communication may be a communication to communicate the transaction information. As examples, the direct communication may be a QR communication, a near field communication (NFC), a Wi-Fi Direct (WFD) communication, a Bluetooth communication, or the like. For example, in the case of a QR communication, the POS device 120 may display a QR code including transaction information, such as information identifying the merchant, information identifying the merchant financial institution account 190, information identifying the transaction, information identifying the transaction amount, or the like. In this case, the user device 110 may read the QR code, and obtain the transaction information, such as the information identifying the merchant, information identifying the merchant financial institution account 190, information identifying the transaction, information identifying the transaction amount, or the like. Alternatively, the user device 110 may display a QR code including transaction information, such as information identifying the customer, information identifying the customer financial institution account 160, or the like. In this case, the POS device 120 may read the QR code, and obtain the transaction information, such as the information identifying the customer, information identifying the customer financial institution account 160, or the like.

The payment facilitator device 130 may receive the payment request from the POS device 120. For example, the POS device 120 may perform the direct communication with the user device 110, receive transaction information from the user device 110 based on performing the direct communication, and provide the payment request and the transaction information to the payment facilitator device 130.

Alternatively, the payment facilitator device 130 may receive the payment request from the user device 110. For example, the user device 110 may perform the direct communication with the POS device 120, receive transaction information from the POS device 120 based on performing the direct communication, and provide the payment request and the transaction information to the payment facilitator device 130.

As further shown in FIG. 3, the process 300 may include receiving a customer authorization for the transaction (operation 320). For example, the payment facilitator device 130 may receive a customer authorization from the user device 110.

The payment facilitator device 130 may receive the customer authorization from the user device 110 in the payment request. For example, the user device 110 may provide the payment request including the customer authorization. Alternatively, the payment facilitator device 130 may provide a request for the customer authorization to the user device 110, and receive the customer authorization based on providing the request. For example, in the situation where the POS device 120 provides the payment request to the payment facilitator device 130, the payment facilitator device 130 may receive the payment request and provide a request for the customer authorization to the user device 110. In this case, the payment facilitator device 130 may identify the user device 110 based on the transaction information, such as information identifying the user device 110 and/or the customer, included in the payment request, and provide the request for the customer authorization based on the transaction information.

The customer authorization may include information authorizing the transaction. For example, the user device 110 may generate the customer authorization based on the user authorizing the transaction, based on the user performing an authentication and/or authorization process, or the like.

As further shown in FIG. 3, the process 300 may include providing a payment authorization to an RTP network to initiate an RTP for the transaction amount of the transaction from the customer financial institution account to the merchant financial institution account, based on receiving the customer authorization for the transaction (operation 330). For example, the payment facilitator device 130 may provide a payment authorization to the RTP network 140 to initiate an RTP for the transaction amount of the transaction from the customer financial institution account 160 to the merchant financial institution account 190.

The RTP network 140 may include a payment rail such as The Clearing House (TCH) RTP (TCH RTP), TCH RTP with RFP, FedNow with Direct Credit, Automated Clearing House (ACH), same-day ACH, or the like.

The payment facilitator device 130 may provide the payment authorization to the customer financial institution server 150. For example, the payment facilitator device 130 may identify the transaction information, such as the information identifying the customer financial institution account 160 and the merchant financial institution account 190 from the payment request, and provide the payment authorization to the customer financial institution server 150 to initiate the RTP from the customer financial institution account 160 to the merchant financial institution account 190. The customer financial institution server 150 may provide an RTP to the merchant financial institution server 180 such that the transaction amount is transferred from the customer financial institution account 160 to the merchant financial institution account 190 via the RTP. The customer financial institution server 150 may provide a payment success notification to the payment facilitator device 130. The payment facilitator device 130 may provide a payment success notification to the user device 110 and/or the POS device 120.

Alternatively, the payment facilitator device 130 may provide the payment authorization to the sponsor financial institution server 170. In some cases, the sponsor financial institution server 170 is associated with a sponsor that permits the entity associated with payment facilitator device 130 to onboard new customers, accept payments, etc. Further, the sponsor may ensure that various regulatory rules are complied with by the entity associated with the payment facilitator device 130.

The sponsor financial institution server 170 may receive the payment authorization, and provide a payment request to the customer financial institution server 150. The customer financial institution server 150 may receive the payment request from the sponsor financial institution server 170, and provide an RTP to the sponsor financial institution server 170. The sponsor financial institution server 170 may receive the RTP from the customer financial institution server 150, and provide the RTP to the merchant financial institution server 180 such that the transaction amount is transferred from the customer financial institution account 160 to the merchant financial institution account 190 in the RTP. The sponsor financial institution server 170 may provide a payment success notification to the payment facilitator device 130. The payment facilitator device 130 may provide a payment success notification to the user device 110 and the POS device 120.

As used herein, an "RTP" may refer to a payment that is made between a set of accounts (e.g., the customer financial institution account 160 and the merchant financial institution account 190) without the utilization of a credit card or a debit card and/or the utilization of a credit card network, a debit card network, or the like. Further, an RTP may refer to a remittance between a source account and a destination account. The transaction process may include zero, one, or n (e.g., n>1) intermediary accounts. An RTP may also be referred to as an "instant payment," a "faster payment," or the like.

Although FIG. 3 shows example operations of the process 300, the process 300 may include additional operations, fewer operations, different operations, or differently arranged operations than those depicted in FIG. 3. Additionally, or alternatively, two or more of the operations of the process 300 may be performed in parallel.

FIG. 4 is an example diagram of a process 400 of providing an RTP from a customer financial institution account to a merchant financial institution account based on a direct communication between a user device of a customer and a POS device of a merchant and based on a payment request from the user device.

As shown by reference number 410, the user device 110 and the POS device 120 may perform a direct communication regarding a transaction. The POS device 120 may display a QR code including transaction information, such as information identifying the payment request to be made in association with the transaction, information identifying the merchant, information identifying the merchant financial institution account 190, etc. The user device 110 may read the QR code, and obtain the transaction information.

As shown by reference number 420, the user device 110 may provide, to the payment facilitator device 130, a payment request including transaction information, such as information identifying the customer financial institution account 160, information identifying the merchant financial institution account 190, information identifying the transaction, information identifying the payment request to be made in association with the transaction, information identifying the merchant, or the like.

As shown by reference number 430, the user device 110 may provide, to the payment facilitator device 130, a customer authorization for the transaction. The customer authorization may be included in the payment request.

As shown by reference number 440, the payment facilitator device 130 may provide, to the RTP network 140, a payment authorization to initiate an RTP for the transaction amount of the transaction from the customer financial institution account 160 to the merchant financial institution account 190, based on receiving the customer authorization for the transaction.

Figure 5:
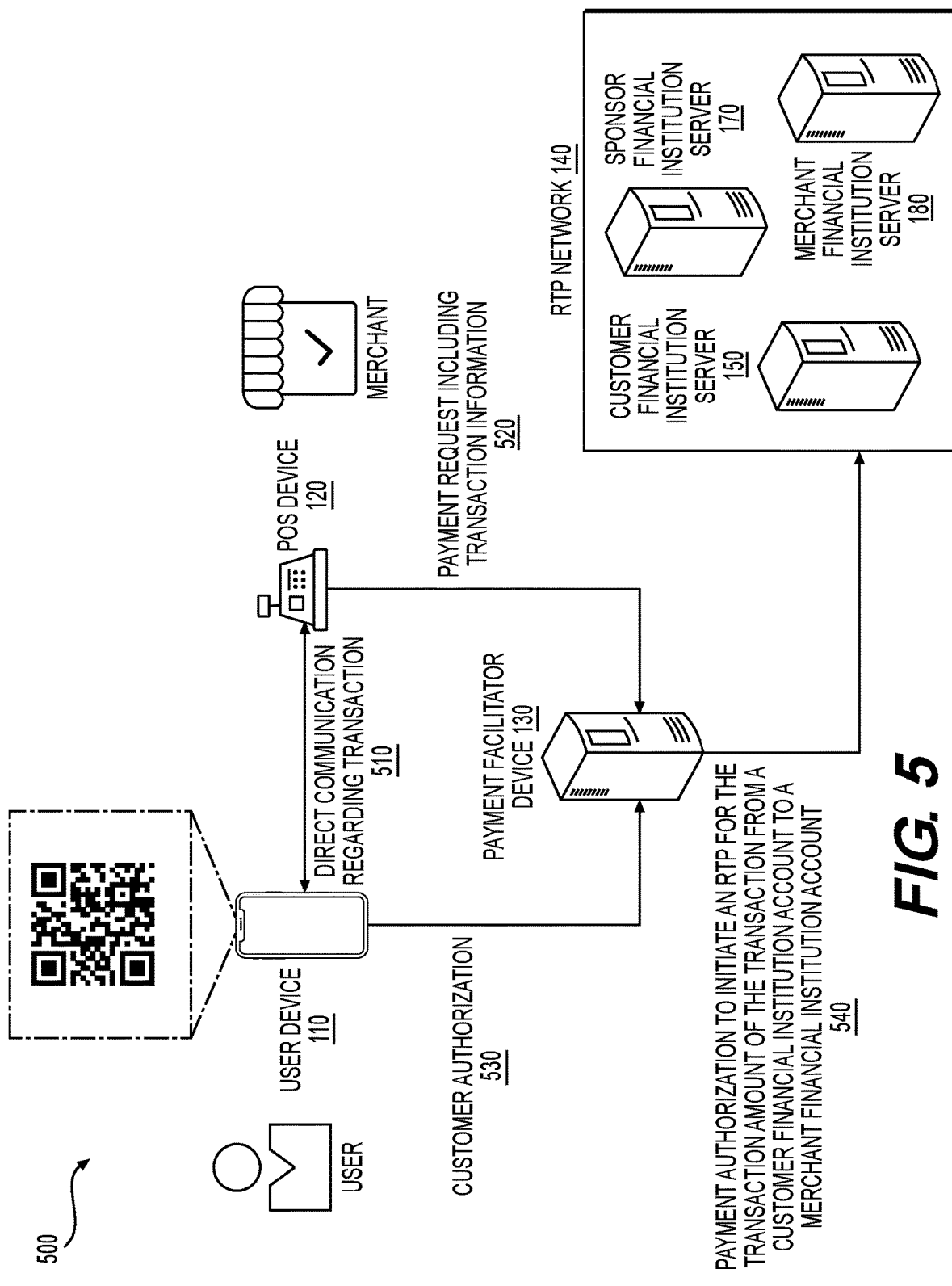
FIG. 5 is an example diagram of a process 500 of providing an RTP from a customer financial institution account to a merchant financial institution account based on a direct communication between a user device of a customer and a POS device of a merchant and based on a payment request from the POS device.

FIG. 5 is an example diagram of a process 400 of providing an RTP from a customer financial institution account to a merchant financial institution account based on a direct communication between a user device of a customer and a POS device of a merchant and based on a payment request from the POS device.

As shown by reference number 510, the user device 110 and the POS device 120 may perform a direct communication regarding a transaction. The user device 110 may display a QR code including transaction information, such as information identifying the customer, information identifying the customer financial account 160, or the like. The user device 110 may read the QR code, and obtain the transaction information.

As shown by reference number 520, the POS device 120 may provide, to the payment facilitator device 130, the payment request including transaction information, such as information identifying the customer financial institution account 160, information identifying the merchant financial institution account 190, information identifying the transaction, information identifying the payment request to be made in association with the transaction, information identifying the merchant, or the like.

As shown by reference number 530, the user device 110 may provide, to the payment facilitator device 130, a customer authorization for the transaction. The user device 110 may provide the customer authorization based on a request for the customer authorization that is received form the payment facilitator device 130. For example, the payment facilitator device 130 may identify the user device 110 based on the transaction information included in the payment request, and provide a request for the customer authorization to the user device 110.

As shown by reference number 540, the payment facilitator device 130 may provide, to the RTP network 140, a payment authorization to initiate an RTP for the transaction amount of the transaction from the customer financial institution account 160 to the merchant financial institution account 190, based on receiving the customer authorization for the transaction.

FIG. 6 is a diagram of an example process of providing a payment authorization to an RTP network to initiate an RTP for a transaction amount of a transaction directly from a customer financial institution account to a merchant financial institution account. As shown by reference number 610, the payment facilitator device 130 may provide, to the RTP network 140, a payment authorization to initiate an RTP for a transaction amount of a transaction from a customer financial institution account 160 to a merchant financial institution account 190. The customer financial institution server 150 may receive the payment request, and, as shown by reference number 620, may provide the RTP for the transaction amount of the transaction to a merchant financial institution server 180.

Figure 7:
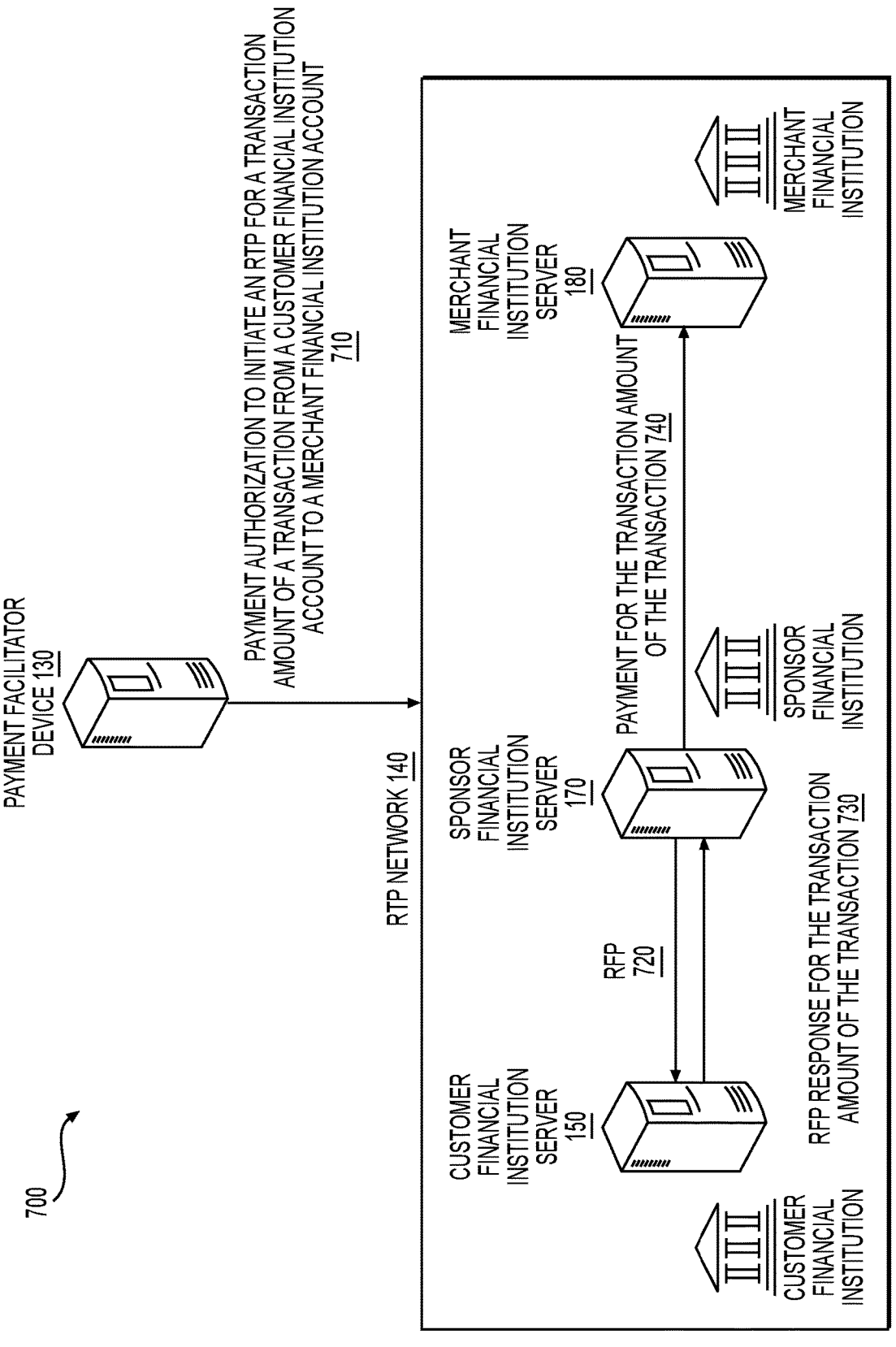
FIG. 7 is a diagram of an example process 700 of providing a payment authorization to an RTP network to initiate an RTP for a transaction amount of a transaction from a customer financial institution account to a merchant financial institution account via a request for payment (RFP) from a sponsor financial institution.

FIG. 7 is a diagram of an example process of providing a payment authorization to an RTP network to initiate an RTP for a transaction amount of a transaction from a customer financial institution account to a merchant financial institution account via an RFP from a sponsor financial institution. As shown by reference number 710, the payment facilitator device 130 may provide, to the RTP network 140, a payment authorization to initiate an RTP for a transaction amount of a transaction from a customer financial institution account 160 to a merchant financial institution account 190. The sponsor financial institution server 170 may receive the payment authorization, and, as shown by reference number 720, provide an RFP to the customer financial institution server 150. The customer financial institution server 150 may receive the RFP, and, as shown by reference number 730, may provide an RFP response for the transaction amount of the transaction to the sponsor financial institution server 170. As shown by reference number 740, the sponsor financial institution server may provide payment for the transaction amount of the transaction to the merchant financial institution account 190.

Figure 8B:
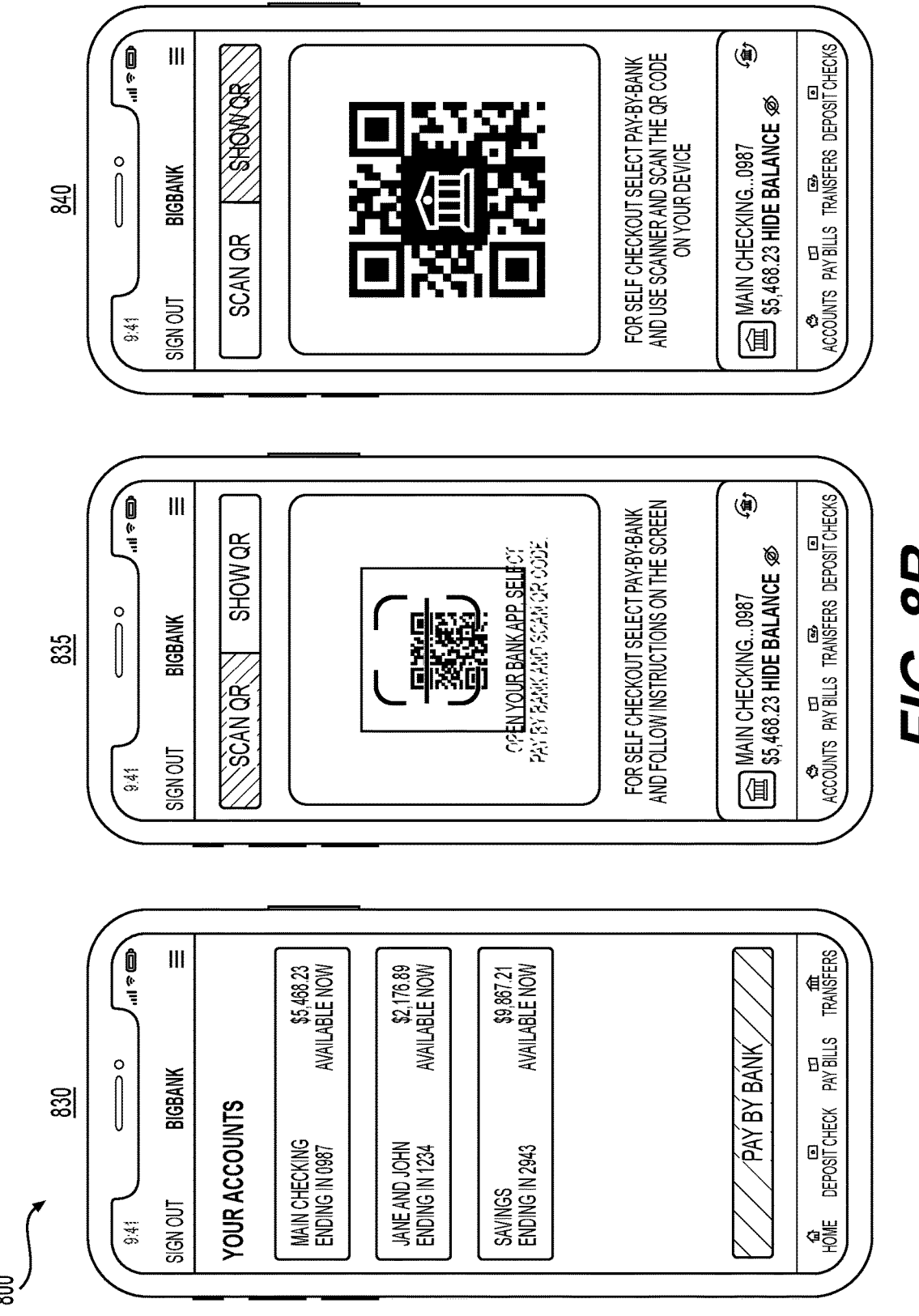

FIGS. 8A and 8B are diagrams of a user interface 800 of an application of the user device 110 that is associated with the customer financial institution. For example, the user device 110 may execute the application associated with the customer financial institution, and provide the user interface 800 for display based on executing the application associated with the customer financial institution.

The application may permit the user device 110 to provide functionality for providing RTPs from the customer financial institution account 160 to the merchant financial institution account 190. For example, the customer may utilize the application on the user device 110 in order to complete a transaction involving a merchant.

As shown by reference number 805, the user interface 800 may display an instruction screen identifying instructions for using the user device 110 in order to provide an RTP to a merchant. For example, the user interface 800 may display instructions instructing the user to: 1) select a "Pay-by-Bank" option on the POS Device 120 during a checkout process; 2) open the customer financial institution application on the user device 110 and select the "Pay-by-Bank"

option; 3) scan a QR code displayed by the POS Device 120; and 4) finish payment on the user device 110.

As shown by reference number 810, the user interface 800 may display an account selection screen that displays the customer financial account(s) 160 that are linked to the customer financial institution application, and that permits the user to select a particular customer financial institution account 160 to be used to provide an RTP to a merchant financial institution account 190.

As shown by reference number 815, the user interface 800 may display a preferences screen that permits the user to set a budget, setup two-factor authentication, and link a customer account associated with a merchant to the customer financial institution application.

As shown by reference numbers 820 and 825, the user interface 800 may display a tutorial screen that provides tips and instructions to the user on how to use the customer financial institution application of the user device 110.

As shown by reference number 830, the user interface 800 may display an accounts screen that identifies the customer financial institution accounts 160 that are linked to the customer financial institution application. Further, as shown, the user interface 800 may display a "Pay-by-Bank" icon that permits the user to initiate pay for a transaction via an RTP.

As shown by reference number 835, the user interface 800 may display a QR screen that includes a "Scan QR" icon, and a "Show QR icon." If the customer selects the "Scan QR" icon, then the user interface 800 displays a view of the camera of the user device 110 including alignment indicators for aligning with a QR code that is displayed via the POS Device 120 and that includes transaction information that is to be communicated to the user device 110. Alternatively, and as shown by reference number 840, if the customer selects the "Show QR" icon, then the user interface 800 displays a QR code including transaction information associated with the transaction to be communicated to the POS Device 120. The customer may interact with the QR screen in order to perform a direct communication with the POS device 120.

As shown by reference number 845, the user interface 800 may display a transaction screen that includes transaction details associated with the transaction. For example, the transaction details include a merchant identifier, a date and time of the transaction, and a transaction amount. Further, the user interface 800 may display a payment method of the transaction, a budget of the user, a coupon input area, etc. Further, as shown, the user interface 800 may display an "Approve Purchase" icon that permits the user to authorize the transaction.

As shown by reference number 850, the user interface 800 may display a transaction confirmation screen that displays a confirmation of the transaction and that displays transaction details of the transaction.

Figure 9:
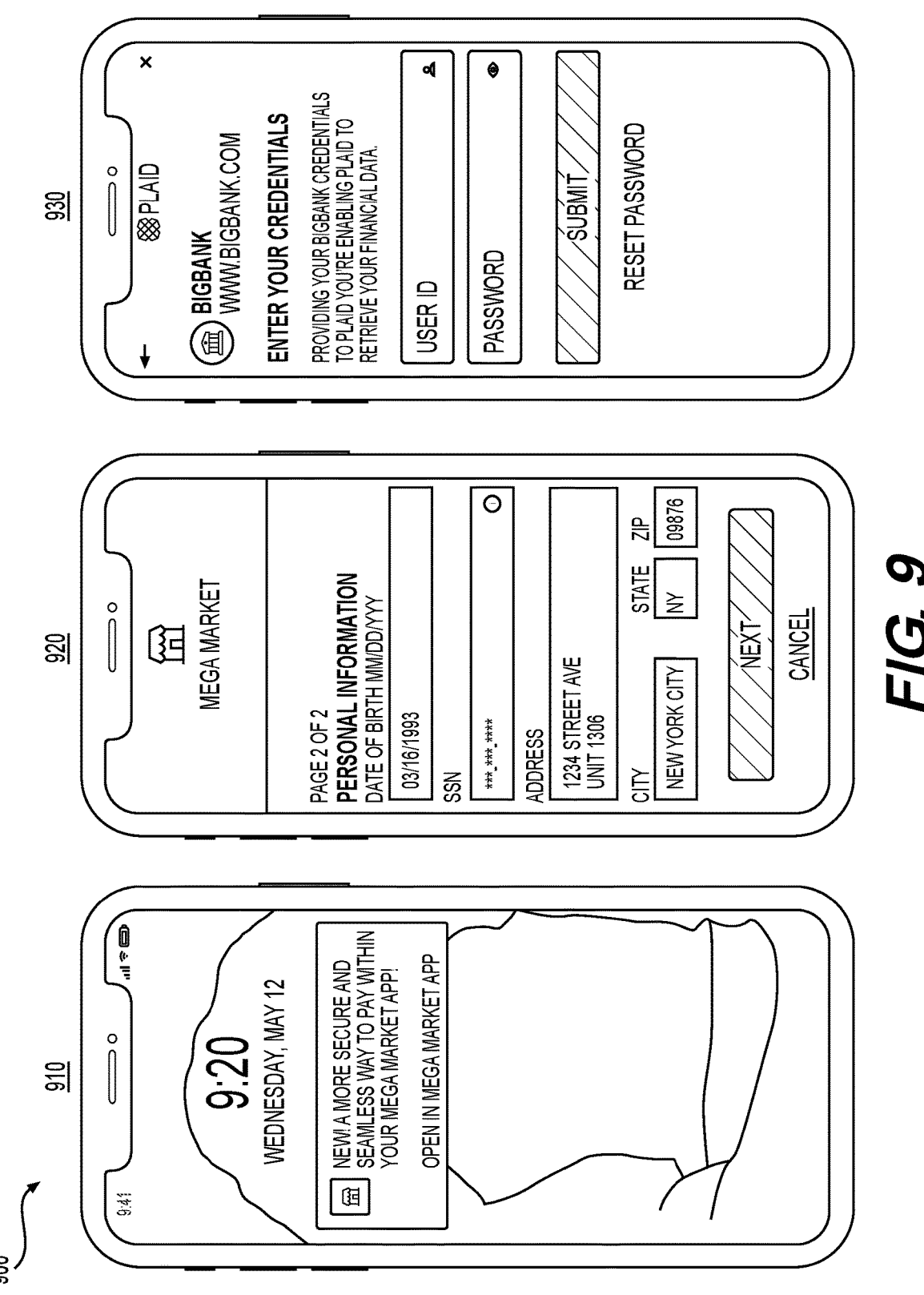
FIG. 9 is a diagram of a user interface 900 of an application of a user device that is provided by a merchant for utilization by a user.
Figure 9:
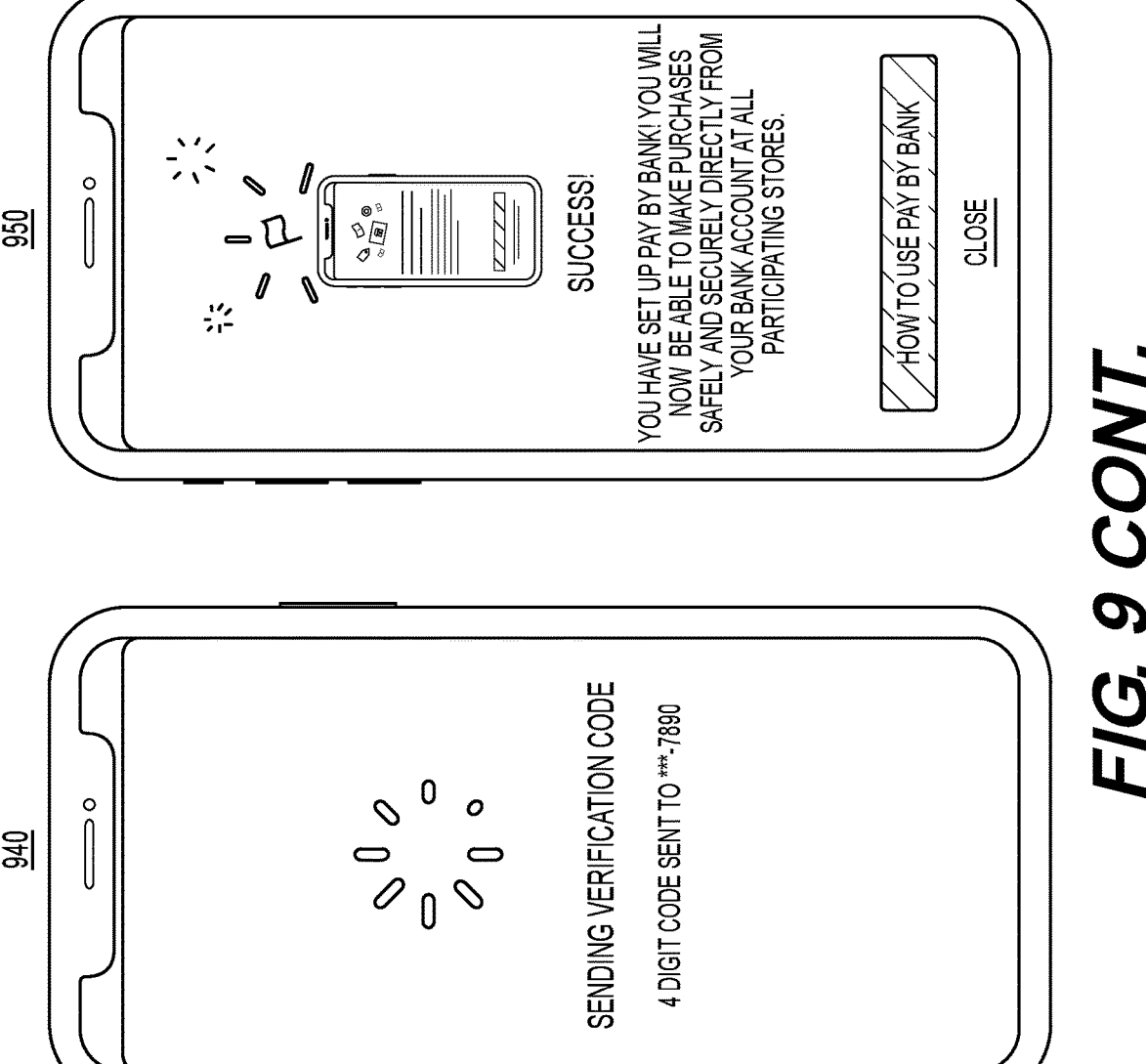

FIG. 9 is a diagram of a user interface 900 of an application of the user device 110 that is provided by a merchant for utilization by a user. For example, the user device 110 may execute the application provided by the merchant, and provide the user interface 900 for display based on executing the application provided by the merchant.

As shown by reference number 910, the user interface 900 may display a notification screen that provides a notification that the application provided by the merchant is available to be used by the user device 110.

As shown by reference number 920, the user interface 900 may display a user information screen that prompts the user to input personal information, such as a date of birth, a social security number, an address, etc.

As shown by reference number 930, the user interface 900 may display a credential screen that prompts the user to link the customer financial institution account 160 to the application provided by the merchant.

As shown by reference number 940, the user interface 900 may display a verification screen that displays information identifying that a verification code was provided to the user device 110.

As shown by reference number 950, the user interface 900 may display a confirmation screen identifying that the customer financial institution account 160 is linked to the application associated with the merchant.

As described herein, example embodiments of the present disclosure improve the efficiency of transactions by providing an RTP from a customer financial institution account to a merchant financial institution account, reduce network delay associated with transactions by avoiding utilization of debit card networks and credit card networks, enhance the security of transactions by exchanging transaction information via a direct communication between the user device and the POS device, and reduce fees associated with transactions by avoiding utilization of debit cards and credit cards.

While principles of the present disclosure are described herein with reference to example embodiments for particular applications, it should be understood that the disclosure is not limited thereto. Those having ordinary skill in the art and access to the teachings provided herein will recognize additional modifications, applications, embodiments, and substitution of equivalents all fall within the scope of the embodiments described herein.

We claim:

1. A payment facilitator device external to a real-time payment (RTP) network comprising:
   a processor; and
   a memory device storing instructions that, when executed by the processor, cause the processor to:
   receive, from a point of sale (POS) device of a merchant, a payment request comprising a transaction amount of a transaction and a device identifier of a user device of a customer participating in the transaction, wherein the device identifier is obtained by the POS device from the user device of the customer during a direct communication with the user device of the customer;
   in response to receiving the payment request comprising the device identifier of the user device, generate a customer authorization request for the received payment request;
   transmit the customer authorization request to the user device based on the device identifier in the payment request;
   receive a customer authorization for the transaction from the user device of the customer; and
   provide a payment authorization to a sponsor financial institution associated with a customer financial institution to initiate a real-time payment (RTP) network external to the payment facilitator device for an RTP for the transaction amount of the transaction from the sponsor financial institution to a merchant financial institution account, based on receiving the customer authorization for the transaction.

2. The payment facilitator device of claim 1, wherein the processor is further configured to:
   receive, from the POS device, transaction information including a customer identifier, a customer financial institution account identifier, a merchant identifier, a merchant financial institution account identifier, the transaction amount, and a payment request identifier.

3. The payment facilitator device of claim 2, wherein the direct communication is a quick response (QR) communication,
   wherein the user device is configured to display a QR code representing the customer identifier and the customer financial institution account identifier, and
   wherein the POS device is configured to read the QR code displayed via the user device, obtain the customer identifier and the customer financial institution account identifier based on reading the QR code, and provide the transaction information to the payment facilitator device based on obtaining the customer identifier and the customer financial institution account identifier from the QR code displayed via the user device.

4. The payment facilitator device of claim 1, wherein the payment request further includes a transaction location.

5. A method performed by a payment facilitator device external to a real-time payment (RTP) network, the method comprising:
   receiving, by one or more processors of the payment facilitator device from a point of sale (POS) device of a merchant, a payment request comprising a transaction amount of a transaction and a device identifier of a user device participating in the transaction, wherein the device identifier is obtained by the POS device from the user device during a direct communication with the user device;
   in response to receiving the payment request comprising the device identifier of the user device, generating, by the one or more processors of the payment facilitator device, a customer authorization request for the received payment request;
   transmitting, by the one or more processors of the payment facilitator device, the customer authorization request to the user device based on the device identifier in the payment request;
   receiving, by the one or more processors of the payment facilitator device, a customer authorization for the transaction from the POS device of the merchant; and
   providing, by the one or more processors of the payment facilitator device, a payment authorization to a real-time payment (RTP) network external to a sponsor financial institution associated with a customer financial institution to initiate a real-time payment (RTP) network external to the payment facilitator device for an RTP for the transaction amount of the transaction from the sponsor financial institution to a merchant financial institution account, based on receiving the customer authorization for the transaction.

6. The method of claim 5, wherein the method further comprises:
   receiving, from the POS device, transaction information including a customer identifier, a customer financial institution account identifier, a merchant identifier, a merchant financial institution account identifier, the transaction amount, and a payment request identifier.

7. The method of claim 6, wherein the direct communication is a quick response (QR) communication,
   wherein the user device is configured to display a QR code representing the customer identifier and the customer financial institution account identifier, and
   wherein the POS device is configured to read the QR code displayed via the user device, obtain the customer identifier and the customer financial institution account identifier based on reading the QR code, and provide the transaction information to the payment facilitator device based on obtaining the customer identifier and the customer financial institution account identifier from the QR code displayed via the user device.

8. The method of claim 5, wherein the payment request further includes a transaction location.

9. A non-transitory computer-readable medium storing instructions that, when executed by a processor of a payment facilitator device external to a real-time payment (RTP) network, cause the processor to:

receive, from a point of sale (POS) device of a merchant, a payment request comprising a transaction amount of a transaction and a device identifier of a user device participating in the transaction, wherein the device identifier is obtained by the POS device from the user device during a direct communication with the user device;

in response to receiving the payment request comprising the device identifier of the user device, generate a customer authorization request for the received payment request;

transmit the customer authorization request to the user device based on the device identifier in the payment request;

receive a customer authorization for the transaction from the POS device of the merchant; and provide a payment authorization to a sponsor financial institution associated with a customer financial institution to initiate a real-time payment (RTP) network external to the payment facilitator device for an RTP for the transaction amount of the transaction from the sponsor financial institution to a merchant financial institution account, based on receiving the customer authorization for the transaction.

10. The non-transitory computer-readable medium of claim 9, wherein the instructions further cause the processor to:

receive, from the POS device, transaction information including a customer identifier, a customer financial institution account identifier, a merchant identifier, a merchant financial institution account identifier, the transaction amount, and a payment request identifier.

11. The non-transitory computer-readable medium of claim 10, wherein the direct communication is a quick response (QR) communication, wherein the user device is configured to display a QR code representing the customer identifier and the customer financial institution account identifier, and wherein the POS device is configured to read the QR code displayed via the user device, obtain the customer identifier and the customer financial institution account identifier based on reading the QR code, and provide the transaction information to the payment facilitator device based on obtaining the customer identifier and the customer financial institution account identifier from the QR code displayed via the user device.

12. The non-transitory computer-readable medium of claim 9, wherein the payment request further includes a transaction location.

* * * * *